(12) United States Patent
Paris

(10) Patent No.: US 11,058,128 B1
(45) Date of Patent: Jul. 13, 2021

(54) PET SUPPLEMENT

(71) Applicant: Amy Paris, Chicago, IL (US)

(72) Inventor: Amy Paris, Chicago, IL (US)

(73) Assignee: Amy Paris, Chicago, IL (US)

( * ) Notice: Subject to any disclaimer, the term of this patent is extended or adjusted under 35 U.S.C. 154(b) by 1662 days.

(21) Appl. No.: 14/819,362

(22) Filed: Aug. 5, 2015

Related U.S. Application Data

(60) Provisional application No. 62/033,286, filed on Aug. 5, 2014.

(51) Int. Cl.
```
A23K 10/00    (2016.01)
A23L 27/26    (2016.01)
A23K 1/00     (2006.01)
A23K 1/16     (2006.01)
```

(52) U.S. Cl.
CPC ............ *A23K 1/001* (2013.01); *A23K 1/1631* (2013.01); *A23K 10/00* (2016.05); *A23L 27/26* (2016.08); *A23V 2250/00* (2013.01)

(58) Field of Classification Search
CPC ...... A23K 10/00; A23L 27/26; A23V 2250/00
See application file for complete search history.

(56) References Cited

U.S. PATENT DOCUMENTS

| | | | | |
|---|---|---|---|---|
| 3,862,336 A | * | 1/1975 | Kofsky | A23K 50/00 426/1 |
| 4,212,896 A | * | 7/1980 | Brown, Jr. | A23K 10/33 426/449 |
| 4,495,208 A | * | 1/1985 | Friedman | A23K 20/158 426/335 |
| 2012/0189751 A1 | * | 7/2012 | Beinecke | A23L 19/13 426/574 |
| 2012/0309829 A1 | * | 12/2012 | Yamka | A61K 31/19 514/557 |

OTHER PUBLICATIONS

"How to Cook Store and Reheat Stew" Available online at https://www.bettycrocker.com/how-to/tipslibrary. (Year: 2006).*
Mykytiuk., "Retort Flexible Packaging—The Revolution Has Begun". Available online at www.flexpackmag.com on Oct. 2002. (Year: 2002).*

* cited by examiner

*Primary Examiner* — Erik Kashnikow
*Assistant Examiner* — Assaf Zilbering
(74) *Attorney, Agent, or Firm* — The Watson IP Group, PLC; Jovan N. Jovanovic

(57) ABSTRACT

A method of making a supplement for a pet. The method mixes an aqueous protein solution with supplements. Once the supplements have been mixed into the aqueous protein solution, a fat constituent is introduced and mixed into the solution. The solution is then cooled and stored. After a predetermined period of time, the mixture is reheated and a thickening agent is introduced into the mixture.

11 Claims, 1 Drawing Sheet

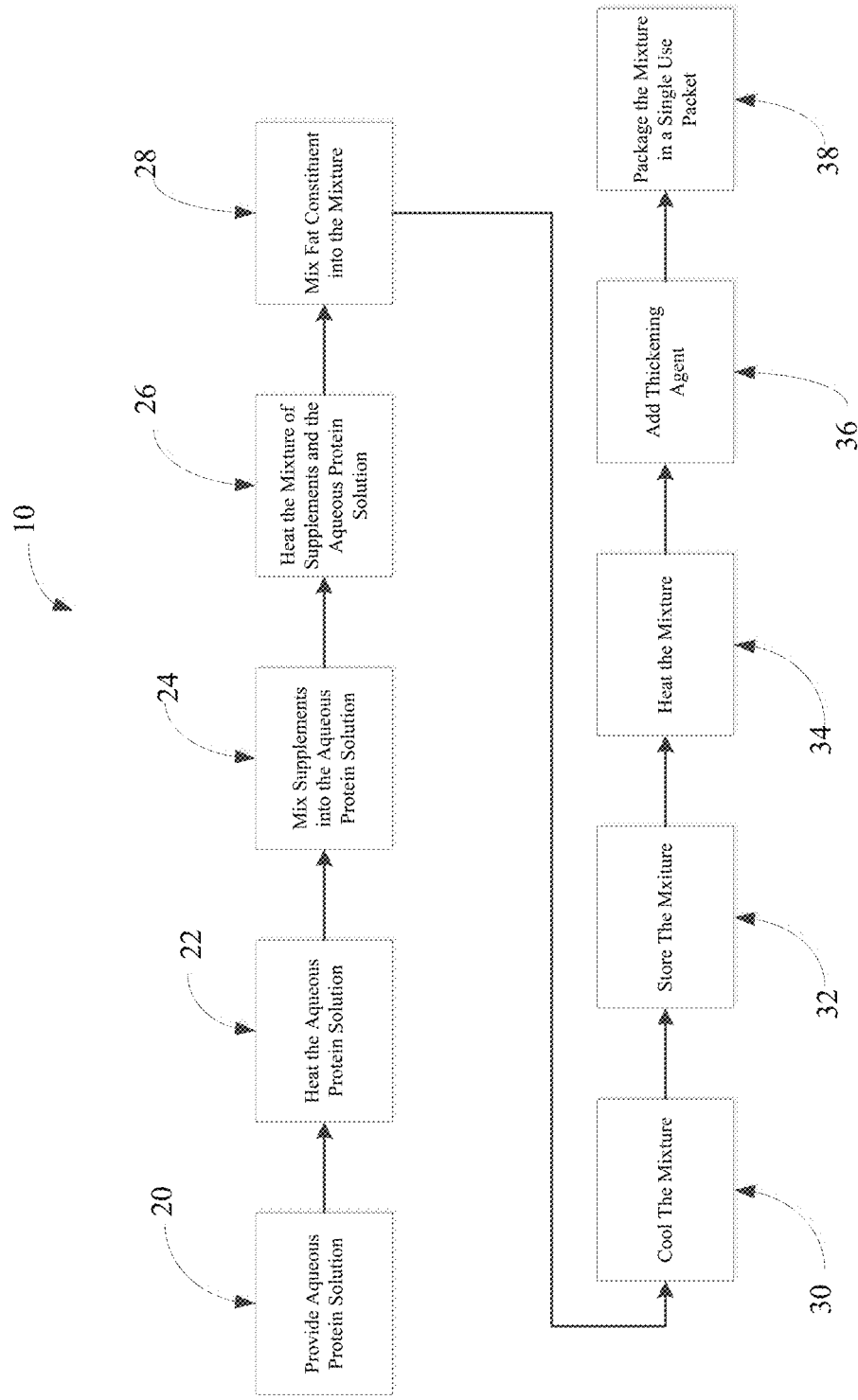

PET SUPPLEMENT

CROSS-REFERENCE TO RELATED APPLICATION

Applicant claims priority from U.S. Provisional Patent Application Ser. No. 62/033,286 entitled "Pet Supplement" filed Aug. 5, 2014, the entire disclosure of which is hereby incorporated by reference in its entirety.

BACKGROUND OF THE DISCLOSURE

1. Field of the Disclosure

The invention relates in general to supplements, and more particularly, to a pet supplement and a manufacturing method associated with the same.

2. Background Art

The use of supplements is known in the art. A number of different supplement delivery methods are likewise known in the art. Typically, such supplements are provided to humans, although there has been an increase in the delivery of supplements to pets.

Problematically, while a human can easily take a pill or the like, it is often difficult to provide a supplement in pill form to a pet. Often, the pet is picky and selectively refuses to eat the pill. Where the pill is inserted into a foodstuff (such as cheese, meat or the like), many pets are adept at eating the foodstuff and leaving behind the pill.

Some solutions have provided the supplement in a liquid or gel form. Problematically, many supplements are difficult to introduce into a liquid or gel form that is palatable to a pet. Where it is palatable, it is often difficult to properly mix the supplements in the liquid or gel.

SUMMARY OF THE DISCLOSURE

The disclosure is directed to a process for making a supplement mixture for a pet comprising the steps of: providing an aqueous protein solution (i.e., protein flavoring); heating the aqueous protein solution; mixing supplements into the aqueous protein solution; heating the mixture of supplements and the aqueous protein solution; mixing the fat constituent into the mixture; cooling the mixture; storing the mixture; heating the mixture after storing the mixture; adding a thickening agent; and packing the mixture in a single use packet.

In some configurations, the protein solution is between 15% and 60% of the overall mixture by volume.

In some configurations, the protein solution is approximately 25% of the overall mixture by volume.

In some configurations, the step of first heating comprises the step of first heating the aqueous protein solution to a temperature of 160° F. and 165° F.

In some configurations, the fat constituent comprises approximately 40% of the overall mixture by volume.

In some configurations, the step of second heating comprises the step of second heating the mixture solution to a temperature of 160° F. and 165° F.

In some configurations, the protein to fat ratio is 25% to 75%.

In some configurations, the step of storing the mixture comprises the step of storing the mixture for between 10 and 14 days.

In some configurations, third heating comprises the step of third heating the mixture to a temperature of 160° F. and 165° F.

In some configurations, the thickening agent comprises one of the group consisting of: maltodextrin and xanthan gum.

In some configurations, the step of packing comprises the step of packing into a flexible packaging pouch.

In another aspect of the disclosure, the disclosure is directed to a process for making a supplement mixture for a pet comprising the steps of: providing an aqueous protein solution (i.e., protein flavoring); first heating the aqueous protein solution to a temperature of between 160° F. and 165° F.; mixing supplements into the aqueous protein solution; second heating the mixture of supplements and the aqueous protein solution to a temperature of between 160° F. and 165° F.; mixing the fat constituent into the mixture; cooling the mixture; storing the mixture for a period of between 10 and 14 days; third heating the mixture after storing the mixture to a temperature of between 160° F. and 165° F.; adding a thickening agent; and packing the mixture in a single use packet.

In some configurations, the protein to fat ratio is 25% to 75%.

In some configurations, the step of storing the mixture comprises the step of storing the mixture for between 10 and 14 days.

In some configurations, the thickening agent comprises one of the group consisting of: maltodextrin and xanthan gum.

In some configurations, the step of packing comprises the step of packing into a flexible packaging pouch.

BRIEF DESCRIPTION OF THE DRAWINGS

The disclosure will now be described with reference to the drawings wherein:

FIG. 1 of the drawings is a process description for the process of making a supplement for a pet.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a process for making a supplement for pets is disclosed. At step 20 an aqueous protein solution is provided. The protein solution comprises substantially entirely protein in aqueous solution. In the completed mixture, it is contemplated that the ratio of the protein content to be approximately 25% and the fat content to be approximately 75%. In other embodiments, it is contemplated that the protein content may comprise between 15% and 60% of the overall content of the mixture.

Once the protein solution is provided, the solution is heated to between 160° F. and 165° F. at step 22. Once at the desired temperature range, the supplements (that is the vitamins, minerals and other beneficial constituents) are introduced and mixed into the aqueous protein solution. It has been found that the mixing and dispersion of the supplements is best achieved through the mixing thereof in the aqueous protein first and at the temperatures disclosed herein.

Once the supplements have been mixed at step 24, the mixture may be cooled and stored for a period of time. If the mixture is cooled and stored, at step 26, the mixture is heated to approximately between 160° F. and 165° F. Once the mixture is heated to the desired temperature, a fat constituent is mixed into the mixture at step 28. In the embodiments contemplated, the fat constituent may comprise at least 40% of the overall mixture by volume. It has been found that the mixture tends to mix better at such temperatures and with the supplements already mixed into the aqueous protein solution.

Once the fat has been mixed into the overall mixture, the mixture is cooled at step 30. The cooled mixture can be stored for a period of fourteen days at step 32. It has been found that storage of the cooled mixture for at least ten to fourteen days has proved beneficial in later processing, and has provided an enhanced flavor profile as well as an enhanced mixture.

Once the time has passed, at step 34, the mixture is heated to approximately between 160° F. and 165° F. Once heated, at step 36, a thickening agent, such as maltodextrin, xanthan gum, or another thickener is introduced into the mixture. Once fully mixed, the mixture can be packaged into a single use package at step 38. Among other issues, the single use package may comprise a flexible packaging pouch or the like from which the mixture can be dispensed.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A process for making a pet supplement mixture comprising the steps of:
    providing, for the pet supplement mixture, an aqueous protein flavoring solution;
    first heating the aqueous protein flavoring solution;
    mixing pet supplements into the aqueous protein flavoring solution, the pet supplements comprising at least one of vitamins and minerals;
    second heating the mixture of pet supplements and the aqueous protein flavoring solution;
    mixing a fat constituent into the mixture;
    cooling the mixture;
    Storing the mixture for 10 to 14 days;
    third heating the mixture after storing the mixture;
    adding a thickening agent; and
    packing the mixture in a single use packet.

2. The process of claim 1 wherein the aqueous protein flavoring solution is between 15% and 60% of the overall mixture by volume.

3. The process of claim 2 wherein the aqueous protein flavoring solution is approximately 25% of the overall mixture by volume.

4. The process of claim 1 wherein the step of first heating comprises the step of first heating the aqueous protein flavoring solution to a temperature of 160° F. and 165° F.

5. The process of claim 1 wherein the fat constituent comprises approximately 40% of the overall mixture by volume.

6. The process of claim 1 wherein the step of second heating comprises the step of second heating the mixture solution to a temperature of 160° F. and 165° F.

7. The process of claim 1 wherein the step of third heating comprises the step of third heating the mixture to a temperature of 160° F. and 165° F.

8. The process of claim 1 wherein the step of packing comprises the step of packing into a flexible packaging pouch.

9. A process for making a pet supplement mixture comprising the steps of:
    providing, for the pet supplement mixture, an aqueous protein flavoring solution;
    first heating the aqueous protein flavoring solution to a temperature of between 160° F. and 165° F.;
    mixing pet supplements into the aqueous protein flavoring solution, the pet supplements comprising at least one of vitamins and minerals;
    second heating the mixture of pet supplements and the aqueous protein flavoring solution to a temperature of between 160° F. and 165° F.;
    mixing a fat constituent into the mixture;
    cooling the mixture;
    storing the mixture for a period of between 10 and 14 days;
    third heating the mixture after storing the mixture to a temperature of between 160° F. and 165° F.;
    adding a thickening agent; and
    packing the mixture in a single use packet.

10. The process of claim 9 wherein the step of storing the mixture comprises the step of storing the mixture for between 10 and 14 days.

11. The process of claim 9 wherein the step of packing comprises the step of packing into a flexible packaging pouch.

* * * * *